(12) United States Patent
Icardi (10) Patent No.: US 9,307,856 B2
(45) Date of Patent: Apr. 12, 2016

(54) MACHINE FOR THE PREPARATION OF BEVERAGES, IN PARTICULAR COFFEE

(75) Inventors: Danilo Icardi, Turin (IT); Sergio Icardi, legal representative, Turin (IT); Maria Teresa Giaretto, legal representative, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 364 days.

(21) Appl. No.: 13/642,709

(22) PCT Filed: Apr. 28, 2011

(86) PCT No.: PCT/IB2011/051880
§ 371 (c)(1),
(2), (4) Date: Oct. 22, 2012

(87) PCT Pub. No.: WO2011/135539
PCT Pub. Date: Nov. 3, 2011

(65) Prior Publication Data
US 2013/0036914 A1 Feb. 14, 2013

(30) Foreign Application Priority Data
Apr. 28, 2010 (IT) .............................. TO2010A0358

(51) Int. Cl.
*A47J 31/46* (2006.01)
*A47J 31/00* (2006.01)
*A47J 31/36* (2006.01)

(52) U.S. Cl.
CPC .............. *A47J 31/005* (2013.01); *A47J 31/369* (2013.01); *A47J 2201/00* (2013.01)

(58) Field of Classification Search
CPC . A47J 31/407; A47J 31/3633; A47J 31/3695; A47J 31/0642; A47J 31/3628; A47J 31/002; A47J 31/0673; A47J 31/3676; A47J 31/3623; A47J 31/005; A47J 31/369; A47J 2201/00; B65D 85/8043
USPC ......... 99/289 R, 295–297, 302 P, 302 R, 303; 426/431–434, 594–596; 137/317–319
See application file for complete search history.

(56) References Cited

U.S. PATENT DOCUMENTS 3,261,695 A * 7/1966 Hollis, Jr. et al. .............. 426/259
3,290,484 A * 12/1966 Day .............................. 219/441

(Continued)

FOREIGN PATENT DOCUMENTS

DE 20 2007 017 480 U1 3/2008
WO 2006/102980 A1 10/2006

*Primary Examiner* — Eric Stapleton
(74) *Attorney, Agent, or Firm* — Sughrue Mion, PLLC (57) ABSTRACT

The machine (1) comprises a support structure (3), in which the following are provided:
  a refillable water reservoir (4);
  a boiler (6) provided with an electric heater (7, 8);
  a pump (9) for supplying a flow of water from the reservoir (4) to the boiler (6);
  a first electric connector (5) for connecting the machine (1) to an AC supply voltage source;
  a dispensing unit (35) which is connected to the boiler (6), for dispensing a flow of hot water and/or steam, and to which the following can be coupled:
  a dose-holder unit (36) for receiving a dose, pre-packaged or loose, of a substance for the preparation of a beverage;
  a unit (24) for controlling operation of the machine (1); and
  at least one operating device (25) which can be operated so as to activate preparation of a beverage.
The support structure (2, 3) comprises a fixed part (2) and a movable part (3) which can be coupled and uncoupled to/from each other and are provided with respective cooperating means for providing electric and hydraulic connections (12, 16, 17; 13, 20, 21).
When the movable part (3) is coupled to the fixed part (2), the machine (1) as a whole is capable of operating with water drawn from the reservoir (4) and using AC electric power.
When the movable part (3) is uncoupled from the fixed part (2), this movable part (3) is capable of operating autonomously with water supplied to the boiler (6) via a water inlet means (32) and using DC electric power.

9 Claims, 6 Drawing Sheets

(56) References Cited

U.S. PATENT DOCUMENTS

| | | | |
|---|---|---|---|
| 3,485,162 A * | 12/1969 | Hopkinson et al. | 99/283 |
| 4,426,919 A * | 1/1984 | Rhoten | 99/289 T |
| 5,953,981 A * | 9/1999 | Lassota | 99/281 |
| 6,044,753 A * | 4/2000 | Lassota | 99/290 |
| 6,123,010 A * | 9/2000 | Blackstone | 99/284 |
| 6,135,009 A * | 10/2000 | Lassota | 99/290 |
| 6,668,704 B1 * | 12/2003 | Lassota | 99/306 |
| 6,706,300 B1 * | 3/2004 | Lassota | 426/433 |
| 7,950,578 B2 * | 5/2011 | Majer | 235/381 |
| 2007/0193451 A1 * | 8/2007 | Brown et al. | 99/279 |
| 2008/0116262 A1 * | 5/2008 | Majer | 235/381 |
| 2010/0098823 A1 * | 4/2010 | Nenov et al. | 426/433 |

* cited by examiner

MACHINE FOR THE PREPARATION OF BEVERAGES, IN PARTICULAR COFFEE

CROSS REFERENCE TO RELATED APPLICATIONS

This application is a National Stage of International Application No. PCT/IB2011/051880 filed Apr. 28, 2011, claiming priority based on Italian Patent Application No. TO2010A000358 filed Apr. 28, 2010, the contents of all of which are incorporated herein by reference in their entirety.

The present invention relates to machines for the preparation of beverages, and in particular a machine for the preparation of coffee.

More specifically the invention relates to a machine of the type comprising a support structure in which the following are provided:
a refillable water reservoir,
a boiler provided with electric heating means,
an electric pump for supplying a flow of water from the reservoir to the boiler,
first electric power supply means for allowing the machine to be powered by an AC supply voltage source;
a dispensing unit which is connected to the boiler, for dispensing a flow of hot water and/or steam, and to which the following may be coupled:
a dose-holder unit for receiving a dose, pre-packaged or loose, of a substance for the preparation of a beverage, in particular ground roasted coffee;
circuit means for controlling operation of the machine; and
at least one operating device which can be operated so as to activate preparation of a beverage.

The machines of the type designed hitherto are intended for use in a predetermined fixed location, in a domestic environment or in communal buildings.

An object of the present invention is to provide such a machine which advantageously offers a greater versatility of use, not limited exclusively to the domestic environment or to communal buildings.

This object, together with other objects, is achieved according to the invention by a machine of the type specified above, characterized in that:
the support structure comprises a fixed part and a movable part which can be coupled and uncoupled to/from each other and are provided with respective cooperating means for providing electric and hydraulic connections;
the fixed part including at least one reservoir;
the movable part including
the pump, the boiler, the dispensing unit, the control circuit means and the operating device as well as
water inlet means, connected to the boiler, and
second electric power supply means for allowing the machine to be powered by a DC voltage source;
the arrangement being such that,
when the movable part is coupled to the fixed part, the machine as a whole is capable of operating with water drawn from the reservoir and using AC electric power supplied by means of said first electric power supply means, and,
when the movable part is uncoupled from the fixed part, said movable part is capable of operating autonomously with water supplied to the boiler via said water inlet means and using DC electric power supplied by said second electric power supply means.

Owing to the abovementioned characteristic features, the movable part of the machine according to the present invention, which is conveniently designed with compact dimensions and a low weight, is portable and able to be used autonomously for the preparation of a beverage, in particular coffee, also outside of the domestic environment or a communal building, for example using the power supplied by an internal rechargeable battery, where present, or inside or close to a motor vehicle, using as the electric power source the battery or batteries with which said vehicle is provided, or in any case connected to another DC electric power source.

Further characteristic features and advantages of the invention will become clear from the following detailed description provided purely by way of a non-limiting example, with reference to the accompanying drawings in which.

Figure 1:
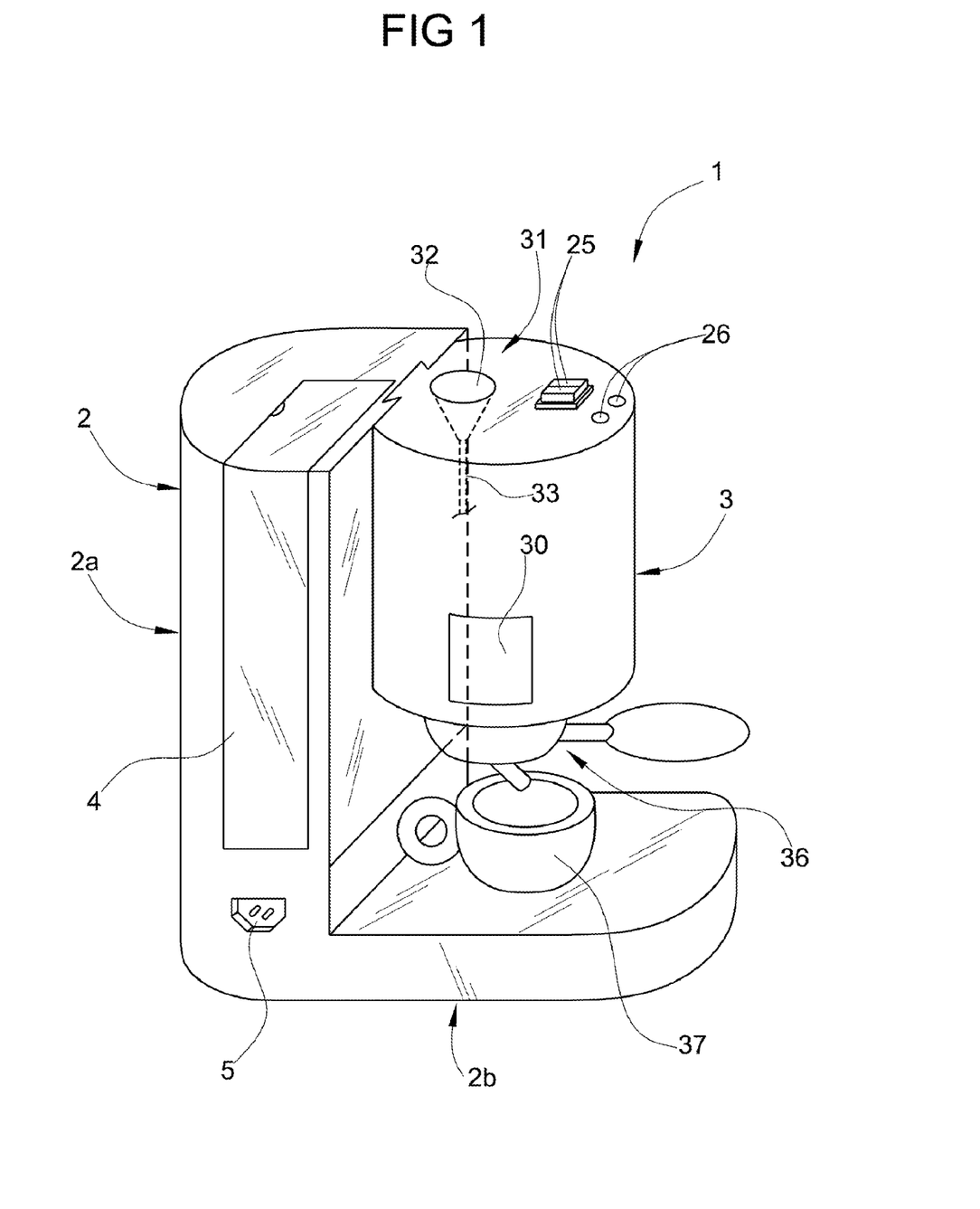
FIG. 1 is a perspective view of a machine for the preparation of beverages according to the present invention, in the configuration where the movable part is coupled to the fixed part, for use typically in a domestic environment or in a communal building.
Figure 2:
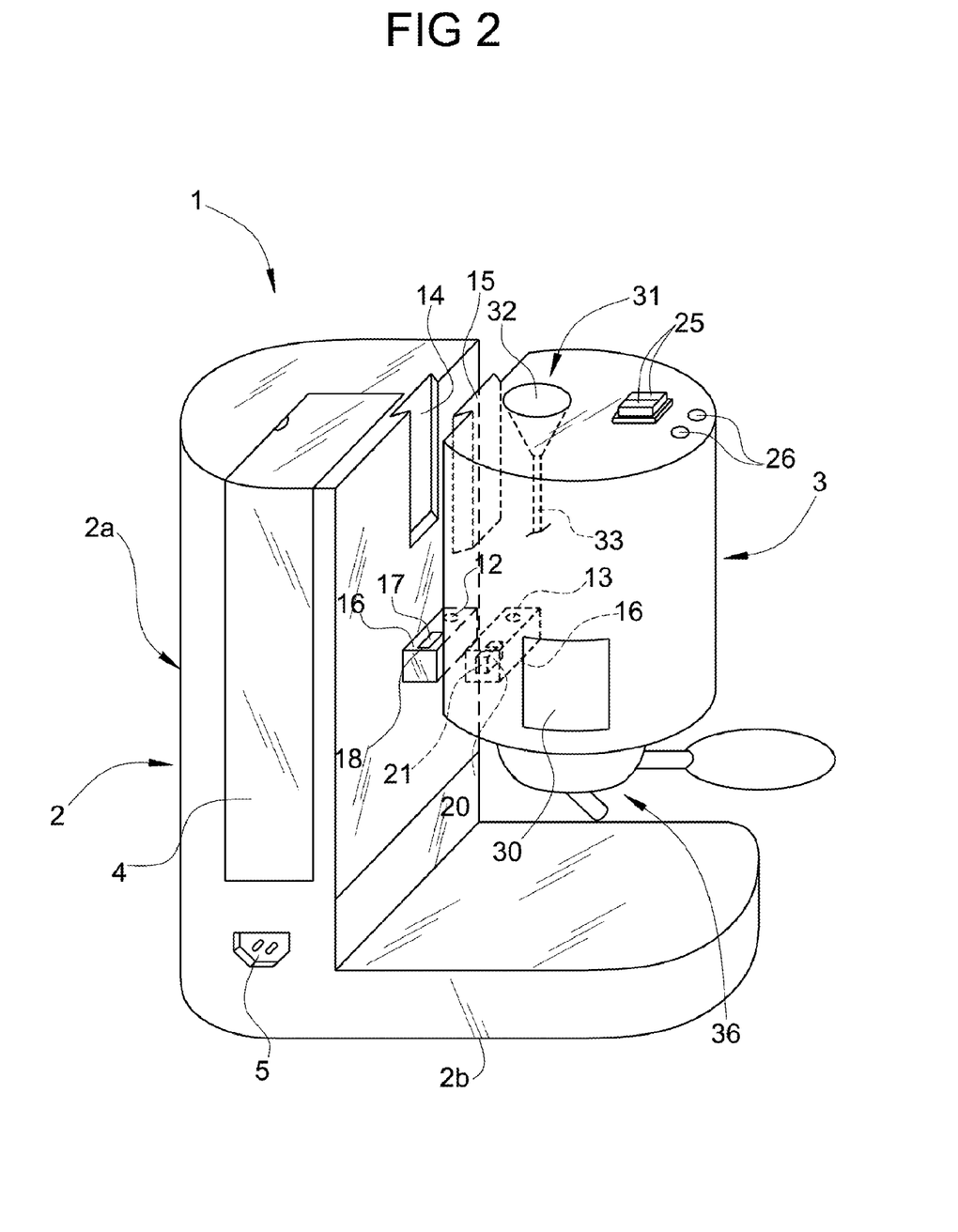
FIG. 2 is a perspective view of the machine according to FIG. 1, shown with the movable part uncoupled from the fixed part.
Figure 4:
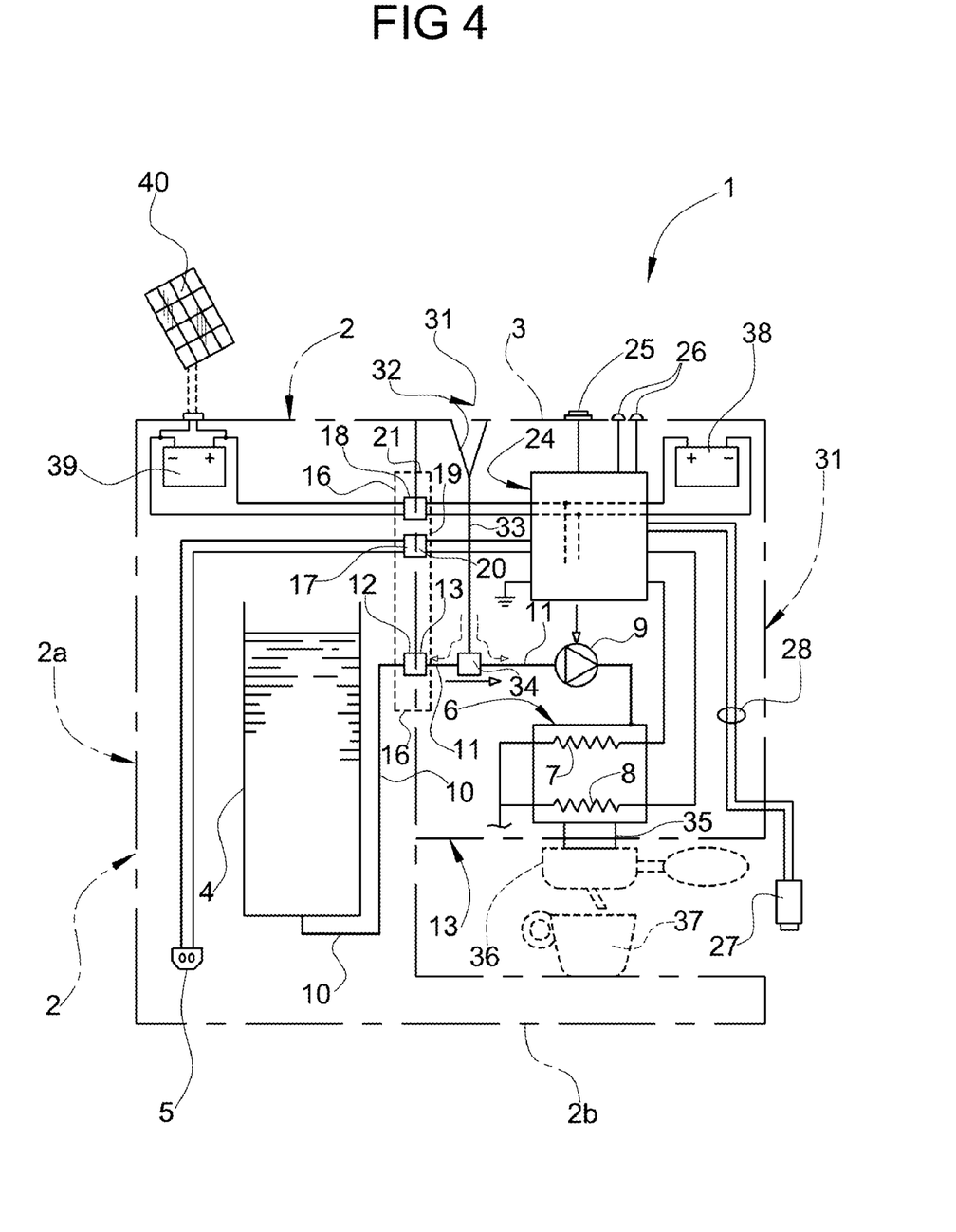
FIG. 4 is a schematic illustration showing the layout of a machine according to the invention.

In FIGS. 1, 2 and 4, 1 denotes overall a machine for the preparation of beverages, in particular coffee, according to the present invention.

In the embodiment shown by way of example, the machine 1 comprises a support structure including a fixed base part 2 and an associated, portable, movable part 3.

In the non-limiting example of embodiment shown, the fixed base part 2 has a general L-shaped form, with a part 2a which extends in an essentially vertical direction, connected at the bottom to a part 2b which extends substantially horizontally.

In a manner known per se, the fixed base part 2, in particular its vertical portion 2a, is provided with a refillable reservoir 4 for the water required for preparation of the beverages.

Moreover, the base part 2 is provided with an electric power supply device 5, in the form of a connector suitable for allowing connection of the machine 1 to an AC supply voltage source (typically the electricity mains operating at 50 Hz or 60 Hz).

In the non-limiting example shown in the drawings, the movable part of the machine 1 has an approximately cylindrical form with a small diameter.

As can be seen in particular in FIG. 4, a boiler 6 is mounted in the movable part 3 of the machine, said boiler being provided with electric heating devices, such as two armoured resistors 7 and 8 for operation with the AC power supply and DC power supply, respectively.

An electric pump 9 is also mounted inside the movable part 3, with its output side connected to the boiler 6 and its input side connected to the reservoir 4.

In particular, in the embodiment shown in FIG. 4, the intake side of the pump 9 is connected to the reservoir 4 by means of two lines 10 and 11, the first one of which extends between the reservoir 4 and a semi-coupling 12 of the fixed base part 2 and the second one of which extends between the pump 9 and a semi-coupling 13 mounted in the movable part 3.

When the movable part 3 of the machine 1 is coupled to the fixed base part 2, as shown in FIGS. 1 and 4, the semi-couplings 12 and 13 are joined together so that the intake side of the pump 9 is effectively connected to the reservoir 4 of the fixed part 2.

The semi-couplings 12 and 13 may be conveniently provided, in a manner known per se, with respective shut-off valves (likewise of a type known per se), such that said semi-couplings are shut off when they are disconnected from each other as a result of separation of the movable part 3 from the base part 2 of the machine.

With reference to FIGS. 1 and 2, in the embodiment shown by way of example, the vertical wall of the portion 2a of the base 2, which is directed towards the movable part 3, has a retaining and guide formation 14 in the form of a groove with dovetail cross-section. A tongue 15 of matching shape can be engaged inside this formation.

Engagement of the tongue 15 and the movable part inside the retaining and guide formation 14 results in stable fixing of the movable part 3 to the fixed base 2. In the embodiment shown, below the retaining and guide formation 14, the base part 2 has a projecting formation 16 (FIG. 2), the top part of which is provided with the hydraulic semi-coupling 12 and two electric connectors 17 and 18, which will be described below.

Figure 3:
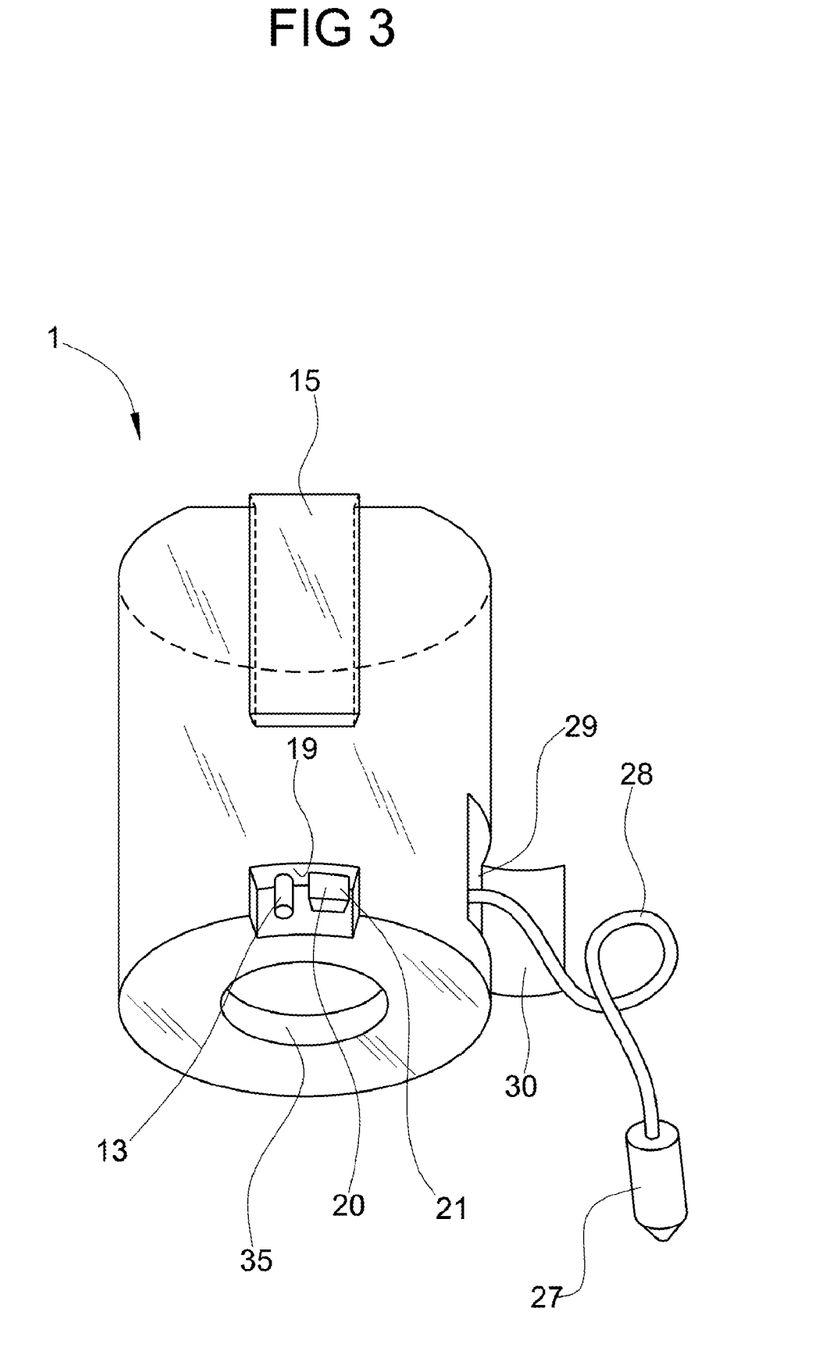
FIG. 3 is a perspective view of the movable part of the machine according to the preceding figures.

As can be seen in FIG. 3, the bottom of the rear wall of the movable part 3 is provided with a recessed seat 19 having a shape substantially matching that of the projecting formation 16 of the fixed base 2. The hydraulic semi-coupling 13 and two electric connectors 20 and 21 extend inside the recessed seat 19 of the movable part.

The arrangement is such that when the movable part 3 is coupled to the fixed part, engagement between the recessed seat 19 of the movable part 3 and the projecting formation 13 of the fixed part 2 results in connection of the hydraulic semi-couplings 12 and 13 and the pairs of electrical connectors 17-20 and 18-21 (see FIG. 4).

The movable part 3 is also provided with electrical/electronic circuits for controlling operation of the machine, denoted overall by 24 in FIG. 4. These circuits, which may be formed on one or more printed circuit boards, comprise both the circuits for controlling the power supply to the various devices of the machine and circuits (including for example a microprocessor) for co-ordinated control of the functions of said devices.

In the embodiment shown, switches 25 for activating operation of the machine 1 as well as one or more indicator lamps 26 for signalling the operating conditions of the machine are connected to the control circuits 24.

The control circuits 24 are connected to the pump 9 and to the heating resistors of the boiler 6 as well as to the connector 20.

When the movable part 3 is coupled to the fixed part (FIG. 4), the control circuits 24 are connected to the connector 5 which is intended to be connected to an AC power source.

The control circuits 24 may also be connected to a connector 27 (see FIGS. 3 and 4) which can be connected to a DC power source such as a cigarette lighter power socket in a motor vehicle. In the embodiment shown by way of example, the connector 27 and the associated connection cable 28 may be stowed away inside a special compartment 29 formed in the movable part 3 (FIG. 3) and provided with a closing flap 30.

With reference to FIGS. 1, 2 and 4, the movable part 3 is conveniently provided with a device 31 for allowing water to be introduced into the boiler 6. In the embodiment shown, this device comprises essentially a funnel 32, the inlet mouth of which can be accessed at the top in the movable part 3, and a connection pipe 33 which connects together the funnel outlet 32 and a valve device 34 arranged along the line 11 of the movable part (FIG. 4).

The valve unit 34 is designed in a manner known per se so as to allow connection of the funnel 32 to the reservoir 4 as well as connection to the intake side of the pump 9 when the movable part 3 is coupled to the fixed part 2 (FIG. 4).

The funnel 32 therefore allows the reservoir 4 to be periodically refilled.

The valve unit 34 is also designed so that, when the movable part 3 is uncoupled from the fixed part 2, the funnel 32 is able to communicate with the boiler 6, as shown by the arrow in broken lines in FIG. 4.

With reference to FIGS. 3 and 4, a dispensing unit 35 is associated with the boiler 6 and can receive, coupled thereto, a dose-holder unit 36, of the type known per se, able to receive a dose (pre-packaged or loose inside a pod or capsule or the like) of a substance for the preparation of a beverage, such as ground roasted coffee.

When movable part 3 of the machine 1 is coupled to the fixed part, this machine operates in a conventional manner: the user loads a dose inside the unit 36, couples said dose-holder unit 36 to the dispensing unit 35 and then operates the switch 25 so as to activate preparation of a beverage which will be dispensed into a container such as small cup 37 arranged underneath the dose-holder unit 36. The control circuits 24 supply current to the heating resistor 7 and activate the pump 9 which supplies a flow of water from the reservoir 4 to the boiler 6. Via the dispensing unit 35, a flow of hot water which may be mixed with steam reaches the dose of substance contained in the unit 36 and, by means of infusion, the beverage is prepared and flows down into the container 37.

This operating mode is particularly convenient for use of the machine 1 in a domestic environment or in communal buildings.

It is also possible to uncouple the movable part 3 from the fixed part 2 of the machine and use the movable part 3 autonomously for the preparation of a beverage outside the domestic environment or such a building, for example inside or close to a motor vehicle.

For this purpose, the user may connect the control circuits 24 to a DC power source via the connector 27 and the necessary water may be introduced via the funnel 32. For the preparation of a beverage in these conditions, the user performs the same operations which are performed for example in a domestic environment. During independent operation, using a DC power supply, the control circuits 24 supply current to the heating resistor 8 of the boiler.

In order to use only the movable part 3 in an external environment, this movable part may be equipped if necessary with a glass or cup holder device, for example of the jaw type, which can be coupled to the movable part 3 or is already provided in said movable part and can be extracted when needed.

Conveniently, as shown in FIG. 4, the movable part 3 may be provided with an electric battery 38 for allowing this movable part 3 to operate autonomously, irrespective as to any connection of the control circuits 24 to a DC power source via the connector 27.

In particular, the arrangement may be such that, when the movable part 3 is coupled to the fixed part 2 and the latter is connected to a power source, the control circuits 24 ensure that the battery 38 is kept charged so as to prepare it for subsequent use.

Figure 5:
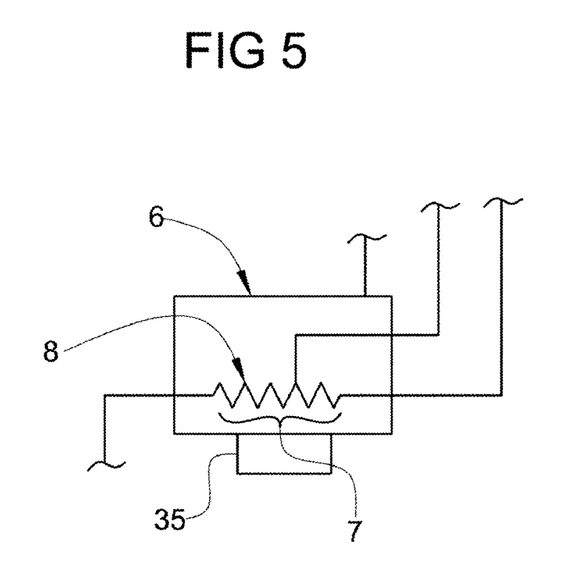
FIG. 5 is a partial electric diagram which shows a variation of embodiment of a boiler for the movable part of a machine according to the present invention.

FIG. 5 shows a variation of embodiment of the boiler 6 in which the heating resistive means comprise a single resistor 7 with an intermediate socket. For operation using AC power, the entire resistor 7 is used, while for operation using DC power only the portion indicated by 8, situated between one end of the resistor and its central socket, is used.

The fixed part 2 may optionally also be provided with its own electric battery—denoted by 39 in FIG. 4—able to be connected to the control circuits 24 of the movable part 3 by means of the electric connectors 18 and 21. The battery 39 may be recharged in the control circuits 24 with the power supplied by the AC power source connected to the connector 5 and if necessary with the power supplied by a photovoltaic panel 40 which may be conveniently associated with the fixed part 2.

Figure 6:
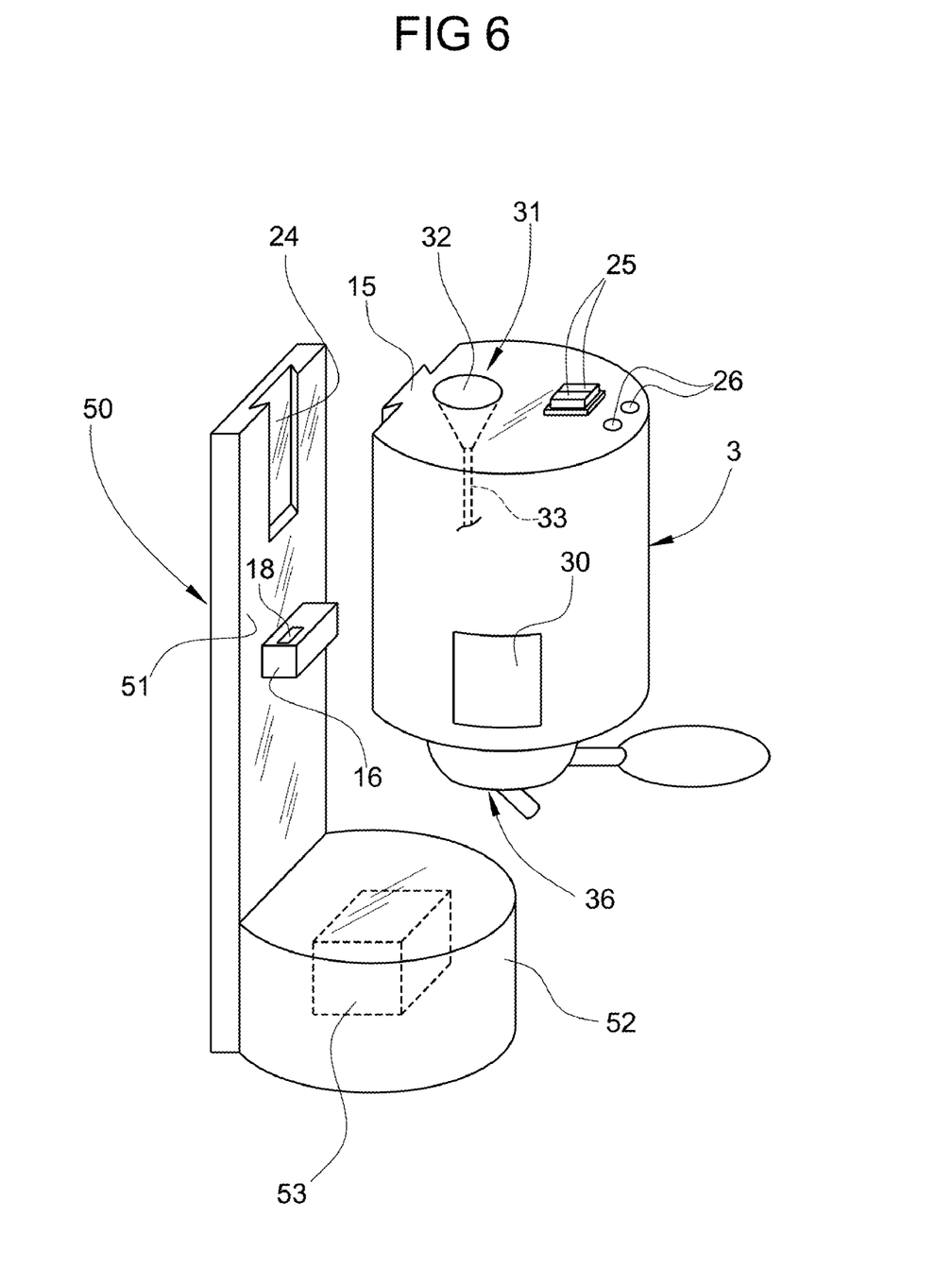
FIG. 6 is a perspective view which shows the movable part of a machine according to the invention and an associated structural support and electric power supply element for using this movable part outside of the domestic environment.

With reference to FIG. 6, for independent operation of the only movable part 3 in "outdoor" conditions, an accessory support structure 50, smaller in size, may be provided, said structure comprising an upright 51 and a base part 52. The upright 51 has at the top a retaining and guide formation 24 corresponding to that of the fixed base 2. Moreover, the middle part of the upright 51 has a formation 16 similar to that of the base 2 and provided with an electric connector 18.

An electric battery 53 of the rechargeable type is conveniently incorporated in the base 52 of the accessory support structure 50, said battery being connected in a manner not shown to the connector 18, so as to allow the powering of the control circuits 24 of the movable part 3 when the latter is coupled to the auxiliary structure 50.

The base 52 acts as a support for a glass or cup into which the beverage must be dispensed.

Conveniently, the battery 53 of the auxiliary structure 50 may be recharged by connecting it to the mains and/or a photovoltaic panel (not shown in FIG. 6) associated with the auxiliary support structure 50.

The above illustrates the extraordinary versatility of the machine for the preparation of beverages according to the present invention.

Obviously, without affecting the principle of the invention, the embodiments and the constructional details may be significantly varied with respect to those described and illustrated purely by way of a non-limiting example, without thereby departing from the scope of the invention as defined in the accompanying claims.

Thus, for example, the electric connector 5 for supplying an AC voltage could be provided on the movable part 3, instead of on the fixed part 2.

The invention claimed is:

1. A machine for the preparation of beverages (1), comprising a support structure (3), in which the following are provided:
   a refillable water reservoir (4);
   a boiler (6) provided with an electric heater (7, 8);
   an electric pump (9) for supplying a flow of water from the reservoir (4) to the boiler (6);
   first electric power supply (5) for allowing the machine (1) to be powered by an AC supply voltage source;
   a dispensing unit (35) which is connected to the boiler (6), for dispensing a flow of hot water and/or steam, and to which the following can be coupled:
   a dose-holder unit (36) for receiving a dose of a substance for the preparation of a beverage;
   a controller (24) for controlling operation of the machine (1); and
   at least one operating device (25) operable to activate preparation of a beverage,
   wherein the support structure (2, 3) comprises a fixed part (2) and a movable part (3) configured to be coupled and uncoupled to/from each other and respectively provided with electric connectors and hydraulic connectors;
   the fixed part (2) including at least the reservoir (4);
   the movable part (3) including
   the pump (9), the boiler (6), the dispensing unit (35), the controller (24) and the operating device (25), as well as
   water inlet (31), connected to the boiler (6),
   second electric power supply (27; 38) for allowing powering with a DC supply voltage source;
   the arrangement being such that,
   when the movable part (3) is coupled to the fixed part (2), the hydraulic connectors are connected such that the water reservoir communicates with the inlet of the boiler and the electrical connectors are connected such that the controller is powered by the first electric power supply whereby the machine (1) as a whole is configured to prepare a beverage with water drawn from the reservoir (4) and using AC electric power supplied by said first electric power supply (5), and,
   when the movable part (3) is uncoupled from the fixed part (2), the electrical and hydraulic connectors are disconnected whereby said movable part (3) is configured to prepare a beverage autonomously with water supplied to the boiler (6) via said water inlet (32) and using DC electric power supplied by said second electric power supply (27, 38).

2. A machine according to claim 1, wherein the boiler (6) is provided with first and second resistive heaters (7, 8), for operation using an AC and DC power supply, respectively.

3. A machine according to claim 2, wherein said first and second resistive heaters comprise two separate resistors (7, 8).

4. A machine according to claim 2, wherein the boiler (6) is provided with a single heating resistor (7) provided with an intermediate socket, so that, during operation using an AC power supply, the entire heating resistor (7) is used and, during operation using a DC power supply, a portion (8) of said heating resistor (7) is used.

5. A machine according to claim 1, wherein the movable part (3) is provided with a battery (38) configured to be recharged using AC power supplied to the machine (1) by the first electric power supply (5).

6. A machine according to claim 1, wherein the fixed part (2) is provided with an electric battery (39) which can be recharged using AC power supplied to the machine (1) by the aforementioned first electric power supply (5).

7. A machine according to claim 6, wherein a photovoltaic panel (40) is associated with the fixed part (2), being able to be connected to the electric battery (39) of said fixed part.

8. A machine according to claim 1, with which an auxiliary support structure (50) is associated, the movable part (3) being configured to be coupled and uncoupled to/from the said auxiliary support structure for use separately from the fixed part (2).

9. A machine according to claim 8, wherein said auxiliary support structure (50) comprises a rechargeable electric battery (53) configured to be connected to the controller (24) of the movable part (3) when the movable part is coupled to said auxiliary support structure (50).

* * * * *